(12) United States Patent
Liu et al.

(10) Patent No.: US 10,929,743 B2
(45) Date of Patent: Feb. 23, 2021

(54) LEARNING TO SCHEDULE CONTROL FRAGMENTS FOR PHYSICS-BASED CHARACTER SIMULATION AND ROBOTS USING DEEP Q-LEARNING

(71) Applicant: Disney Enterprises, Inc., Burbank, CA (US)

(72) Inventors: Libin Liu, Pittsburgh, PA (US); Jessica Kate Hodgins, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 969 days.

(21) Appl. No.: 15/277,872

(22) Filed: Sep. 27, 2016

(65) Prior Publication Data

US 2018/0089553 A1 Mar. 29, 2018

(51) Int. Cl.
*G06F 17/00* (2019.01)
*G09B 23/30* (2006.01)
*G06N 3/00* (2006.01)
*G06N 3/08* (2006.01)

(52) U.S. Cl.
CPC ............ *G06N 3/006* (2013.01); *G06N 3/008* (2013.01); *G06N 3/08* (2013.01)

(58) Field of Classification Search
CPC ................................ G06N 3/006; G06N 3/08
USPC ....................................................... 706/1–62
See application file for complete search history.

(56) References Cited

U.S. PATENT DOCUMENTS 6,882,992 B1 * 4/2005 Werbos ................ G05B 13/027
706/48
9,053,431 B1 * 6/2015 Commons ............ G06N 3/0454
9,604,359 B1 * 3/2017 Grotmol .................. B25J 9/163
2008/0091628 A1 * 4/2008 Srinivasa ................. G06N 3/08
706/12
2010/0007665 A1 * 1/2010 Smith ..................... G06T 13/40
345/473

(Continued)

OTHER PUBLICATIONS

Abe, Y., and Popovic, J., Simulating 2d gaits with a phase-indexed tracking controller, Computer Graphics and Applications, 2011, IEEE 31, 4 (Jul.), 22-33.

(Continued)

*Primary Examiner* — Brandon S Cole
(74) *Attorney, Agent, or Firm* — Patterson + Sheridan, LLP

(57) ABSTRACT

The disclosure provides an approach for learning to schedule control fragments for physics-based virtual character simulations and physical robot control. Given precomputed tracking controllers, a simulation application segments the controllers into control fragments and learns a scheduler that selects control fragments at runtime to accomplish a task. In one embodiment, each scheduler may be modeled with a Q-network that maps a high-level representation of the state of the simulation to a control fragment for execution. In such a case, the deep Q-learning algorithm applied to learn the Q-network schedulers may be adapted to use a reward function that prefers the original controller sequence and an exploration strategy that gives more chance to in-sequence control fragments than to out-of-sequence control fragments. Such a modified Q-learning algorithm learns schedulers that are capable of following the original controller sequence most of the time while selecting out-of-sequence control fragments when necessary.

20 Claims, 7 Drawing Sheets

(56) References Cited

U.S. PATENT DOCUMENTS

| | | | |
|---|---|---|---|
| 2015/0258683 A1* | 9/2015 | Izhikevich | B25J 9/163 |
| | | | 700/250 |
| 2016/0375592 A1* | 12/2016 | Szatmary | B25J 11/0085 |
| | | | 700/255 |

OTHER PUBLICATIONS

Al Borno, M., De Lasa, M., and Hertzmann, A., Trajectory optimization for full-body movements with complex contacts, 2013, TVCG 19, 8, 1405-1414.

Bastien, F., Lamblin, P., Pascanu, R., Bergstra, J., Goodfellow, I. J., Bergeron, A., Bouchard, N., and Bengio, Y., Theano: new features and speed improvements, Deep Learning and Unsupervised Feature Learning NIPS 2012 Workshop.

Bergstra, J., Breuleux, O., Bastien, F., Lamblin, R, Pascanu, R., Desjardins, G., Turian, J., Warde, Farley, D., and Bengio, Y., Theano: a CPU and GPU math expression compiler. In Proceedings of the Python for Scientific Computing Conference (SciPy). Oral Presentation, 2010.

Buss, B., Ramezani, A., Hamed, K., Griffin, B., Gal Loway, K., and Grizzle, J., Preliminary walking experiments with underactuated 3d bipedal robot marlo, In Intelligent Robots and Systems (IROS 2014), 2014 IEEE/RSJ International Conference on, 2529-2536.

Coros, S., Beaudoin, P., and Van De Panne, M., Robust task-based control policies for physics-based characters, 2009, ACM Trans. Graph. 28, 5 (Dec.), 170:1-170:9.

Coros, S., Beaudoin, P., and Van De Panne, M., Generalized biped walking control. ACM Trans. Graph. 29, 4 (Jul. 2010), 130:1-130:9.

Geijtenbeek, T., and Pronost, N., Interactive character animation using simulated physics: A state-of-the-art review. In Computer Graphics Forum, 2012, vol. 31, Wiley Online Library, 2492-2515.

Glorot, X., Bordes, A., and Bengio, Y., Deep sparse rectifier neural networks, In Proceedings of the Fourteenth International Conference on Artificial Intelligence and Statistics (AISTATS-11), Journal of Machine Learning Research—Workshop and Conference Proceedings, G. J. Gordon and D. B. Dunson, 2011, Eds., vol. 15, 315-323.

Ha, S., and Liu, C. K., Iterative training of dynamic skills inspired by human coaching techniques, ACM Trans. Graph. 34, 1 (Dec. 2014), 1:1-1:11.

Hämäläinen, P., Rajamäki, J., and Liu, C. K., Online control of simulated humanoids using particle belief propagation, ACM Trans. Graph. 34, 4 (Jul. 2015), 81:1-81:13.

Jain, S., and Liu, C. K., Controlling physics-based characters using soft contacts. ACM Trans. Graph, 30, 6 (Dec. 2011) 163:1-163:10.

Kolter, J. Z., Coates, A., Ng, A. Y., Gu, Y., and Duhadway, C., Space-indexed dynamic programming: Learning to follow trajectories, In Proceedings of the 25th International Conference on Machine Learning, ACM, New York, NY, USA, ICML 2008, 488-495.

Kwon, T., and Hodgins, J., Control systems for human running using an inverted pendulum model and a reference motion capture sequence, In Proceedings of the 2010 ACM SIGGRAPH/Eurographics Symposium on Computer Animation, Eurographics Association, SCA, 129-138.

Lee, Y., Wampler, K., Bernstein, G., Popovic, J., and Popovic, Z., Motion fields for interactive character locomotion. ACM Trans. Graph. 29, 6 (Dec. 2010.), 138:1-138:8.

Lee, Y., Kim, S., and Lee, J., Data-driven biped control. ACM Trans. Graph. 29, 4 (Jul. 2010), 129:1-129:8.

Leith, D. J., and Leithead, W. E.. Survey of gain scheduling analysis and design. International Journal of Control 73, 11, 1001-1025, 2000.

Levine, S., and Koltun, V., Learning complex neural network policies with trajectory optimization, In ICML 2014: Proceedings of the 31st International Conference on Machine Learning.

Lillicrap, T. P., Hunt, J. J., Pritzel, A., Heess, N., Erez, T., Tassa, Y., Silver, D., and Wierstra, D., Continuous control with deep reinforcement learning. 2015, CoRR abs/1509.02971.

Liu, L., Yin, K., Wang, B., and Guo, B., Simulation and control of skeleton-driven soft body characters, 2013,ACM Trans. Graph. 32, 6, Article 215.

Liu, L., Van De Panne, M., and Yin, K., Guided learning of control graphs for physics-based characters, In Computer Science Faculty Publications and Reports. University of British Columbia. http://hdl.handle.net/2429/55670, 2015.

Mnih, V., Kavukcuoglu, K., Silver, D., Rusu, A. A., Veness, J., Bellemare, M. G., and et al., Human-level control through deep reinforcement learning, Nature 518, 7540 (Feb. 2015), 529-533, Letter.

Mordatch, I., and Todorov, E., Combining the benefits of function approximation and trajectory optimization, In Proceedings of Robotics: Science and Systems, 2014.

Muico, U., Lee, Y., Popovic, J., and Popovic, Z., Contact-aware nonlinear control of dynamic characters. ACM Trans. Graph. 28, 3, 2009.

Nakanishi, J., Morimoto, J., Endo, G., Cheng, G., Schaal, S., and Kawato, M., Learning from demonstration and adaptation of biped locomotion, Robotics and Autonomous Systems 47, 23, 79-91, 2004.

Peng, X. B., Berseth, G., and Van De Panne, M., Dynamic terrain traversal skills using reinforcement learning, ACM Trans. Graph, 34, 4 (Jul. 2015), 80:1-80:11.

Rabbani, A. H., Van De Panne, M., and Kry, P. G., Anticipatory balance control, In Proceedings of the Seventh International Conference on Motion in Games, ACM, New York, NY, USA, MIG '14, 71-76, 2014.

Sutton, R. S., Precup, D., and Singh, S. P., Intra option learning about temporally abstract actions, In Proceedings of the Fifteenth International Conference on Machine Learning, Morgan Kaufmann Publishers Inc., San Francisco, CA, USA, ICML 1998, 556-564.

Tan, J., Liu, C. K., and Turk, G., Stable proportional derivative controllers, IEEE Comput. Graph. Appl. 31, 4, 34-44, 2011.

Tan, J., Gu, Y., Liu, C. K., and Turk, G., Learning bicycle stunts, ACM Trans. Graph. 33, 4 (Jul. 2014), 50:1-50:12.

Treuille, A., Lee, Y., and Popovic, Z., Near optimal character animation with continuous control, ACM Trans. Graph. 26, 3 (Jul. 2007).

Wang, J. M., Fleet, D. J., and Hertzmann, A., Optimizing walking controllers, ACM Trans. Graph. 28, 5, Article 168, 2009.

Wang, J. M., Fleet, D. J., and Hertzmann, A., Optimizing walking controllers for uncertain inputs and environments, ACM Trans. Graph. 29, 4 (Jul. 2010), 73:1-73:8.

Watkins, C. J. C. H., Learning from Delayed Rewards, PhD thesis, King's College, Cambridge, UK, 1989.

Ye, Y., and Liu, C. K., Optimal feedback control for character animation using an abstract model, ACMTrans. Graph. 29, 4 (Jul. 2010), 74:1-74:9.

Yin, K., Loken, K., and Van De Panne, M., SIMBICON: Simple biped locomotion control, ACM Trans. Graph. 26, 3, Article 105, 2007.

Zordan, V., Brown, D., Macchietto, A., and Yin, K., Control of rotational dynamics for ground and aerial behavior, IEEE Transactions on Visualization and Computer Graphics 20, 10 (Oct. 2014), 1356-1366.

Macchietto, A., Zordan, V., and Shelton, C. R., Momentum control for balance, 2009 ACM Trans. Graph. 28, 3.

* cited by examiner

US 10,929,743 B2

LEARNING TO SCHEDULE CONTROL FRAGMENTS FOR PHYSICS-BASED CHARACTER SIMULATION AND ROBOTS USING DEEP Q-LEARNING

BACKGROUND

Field of the Invention

Embodiments presented herein relate to the field of physics-based character simulation and robot control. More specifically, this disclosure presents techniques for learning to schedule control fragments for virtual characters and robots using deep Q-learning.

Description of the Related Art

With a robust control system, physics-based characters and robots can, in theory, be controlled to respond naturally to actions of a user and changes in their environment. For a variety of behaviors, it is difficult to design such controllers that are responsive to user input and robust to environmental disturbances. One approach for simplifying the control design for complex motions is to track a reference motion, thereby leveraging the natural style and strategies contained in motion capture data. For example, motion capture data from a skateboarder riding a skateboard may be tracked in a simulation of a virtual character riding a skateboard. However, in a robust tracking control system, the tracking reference may need to be rescheduled (e.g., by synchronizing the simulation with the tracking reference on specific events such as ground contact and by planning transitions among multiple behaviors) in order to respond to environmental perturbations and user interactions. For example, in response to a bump in the road, the character riding the skateboard may fall over unless the tracking reference being used is rescheduled, or a transition is made to another behavior, to account for the disturbance and maintain balance of the character.

SUMMARY

One embodiment of this disclosure provides a computer-implemented method for controlling motion. The method generally includes receiving one or more tracking controllers, and training a neural network for scheduling the received controllers or portions thereof based on a state of simulation and a task. The method further includes performing a simulation of a virtual character or controlling motion of a physical robot using the trained neural network.

Further embodiments include a non-transitory computer-readable storage medium storing instructions that when executed by a computer system cause the computer system to perform the methods set forth above, and a computer system programmed to carry out the methods set forth above.

BRIEF DESCRIPTION OF THE DRAWINGS

So that the manner in which the above recited embodiments are attained and can be understood in detail, a more particular description of aspects of this disclosure, briefly summarized above, may be had by reference to the appended drawings. It is to be noted, however, that the appended drawings illustrate only typical embodiments and are therefore not to be considered limiting of its scope, for the invention may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
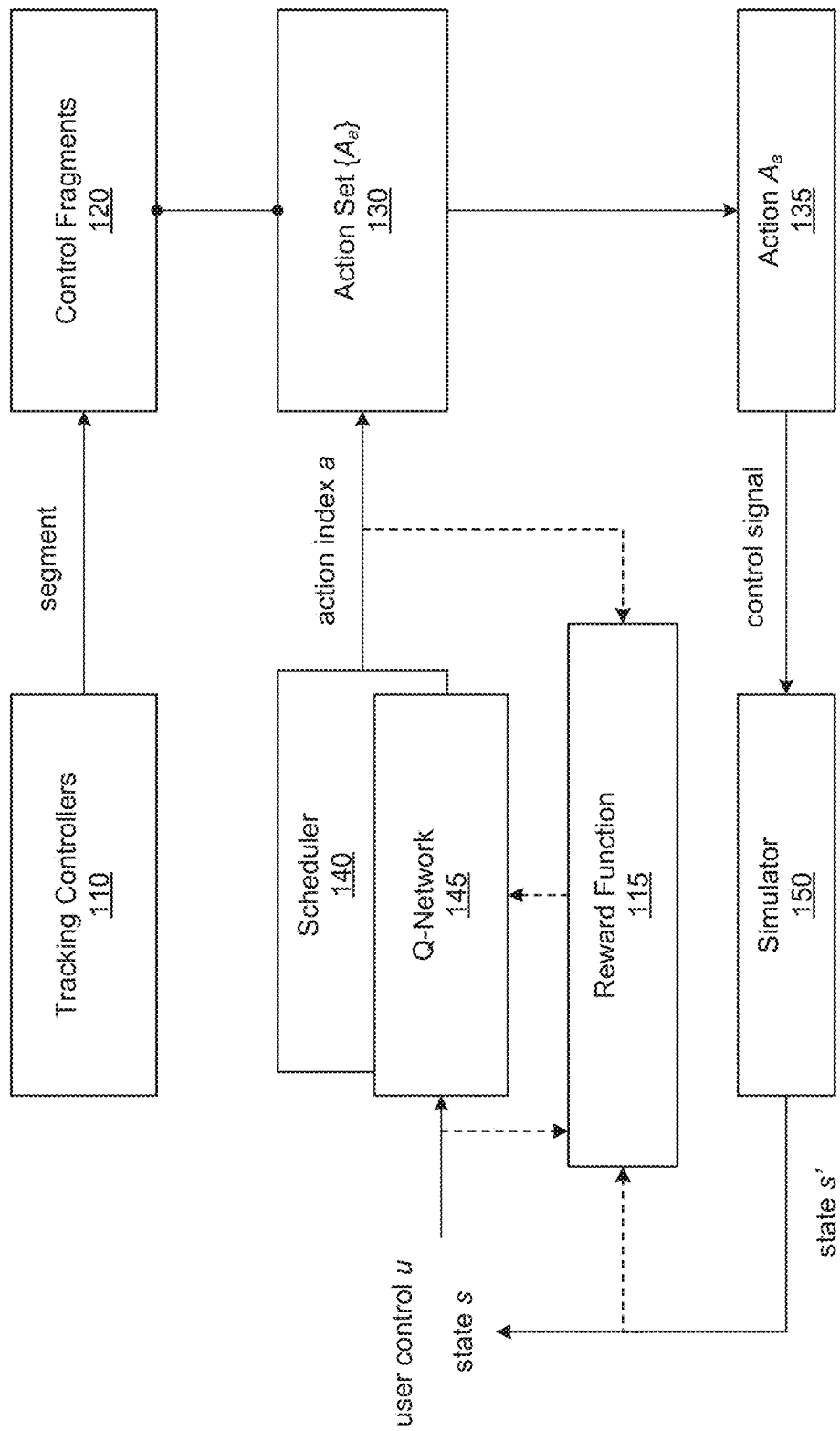
FIG. 1 illustrates an approach for learning schedulers to realize control of behaviors and permit user interaction with simulated characters and physical robots, according to an embodiment.

Embodiments presented herein provide an approach for learning to schedule control fragments for physics-based virtual character simulations and physical robot control. A virtual character may generally be either a three-dimensional (3D) or two-dimensional (2D) virtual character. The scheduling scheme presented herein is applicable to a wide range of behaviors and automatically learns schedulers, thereby permitting interactive control of generic behaviors. Given precomputed tracking controllers, a simulation application treats each individual controller as a series of short control fragments (e.g., fragments that are each 0.1 s in length) and learns a scheduler that selects control fragments at runtime to accomplish a task.

In one embodiment, each scheduler may be modeled with a neural network, or Q-network, that is used to map a high-level representation of the state of the simulation to a control fragment to execute. In such a case, the simulation application may employ a deep Q-learning algorithm to train the scheduler by repeatedly executing the scheduler during off-line simulation. Further, the deep Q-learning algorithm may be adapted to learn schedulers by using a reward function that prefers the original tracking controller sequence and an exploration strategy that gives more chance to in-sequence control fragments than to out-of-sequence control fragments. Doing so may facilitate learning and result in high quality motions, as the original sequence should be largely kept to maintain quality of the resulting motion. The modified Q-learning algorithm learns schedulers that are capable of following such an original sequence most of the time, while selecting out-of-sequence control fragments when necessary. After the scheduler is learned, the simulation application may then evaluate the scheduler during runtime to determine the control fragment to execute given the state of the simulation and the task.

In the following, reference is made to embodiments of the invention. However, it should be understood that the invention is not limited to specific described embodiments.

Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates an approach for learning schedulers to realize control of behaviors and permit user interaction with simulated characters and physical robots, according to an embodiment. In one embodiment, the scheduler may include a neural network, or Q-network, that is used to map a high-level representation of the state of simulation to a control fragment for achieving a task. In particular, the simulation application may learn a different scheduler for each task that routinely reschedules the tracking control based on the state of the simulation and the user's command. Illustratively, the pipeline for learning the scheduler is shown in ghosted lines, while the simulation pipeline is shown in solid lines.

As shown, the simulation application receives as inputs tracking controllers 110 of target behaviors and a reward function 115 that provides a high-level description of the task to be performed. The simulation application is configured to segment each of the input tracking controllers 110 into control fragments 120. In the segmentation, the time interval used may be independent of the target behavior, and such regular segmentation decouples the segments from a particular behavior, lessening the requirement of prior knowledge. For example, each of the control fragments 120 may be 0.1 s in length, and the control fragments 120 collectively form an action set 130, denoted by A={$\mathcal{A}_a$}. A scheduler 140 maintains an artificial neural network, or Q-network 145, that computes the long-term reward of taking an action given a simulation state and task. In one embodiment, the scheduler may include such a Q-network 145 and a linear search on the reward of each control fragment, as output by the Q-network, to find the control fragment with the highest long-term reward for execution. During simulation, the simulation application evaluates the Q-network 145 with the current simulation state and task parameters as input. The simulation application determines based on the Q-network's 145 output a best control fragment, defined as the control fragment having the highest long-term reward, and the simulation application then computes low-level control signals needed to actuate the character (or robot) according to the best control fragment. That is, the simulation application executes the best control fragment by solving the appropriate equations of motions to update the state of the character. The best control fragment is shown in FIG. 1 as the selected control fragment having action index a, and this control fragment $\mathcal{A}_a$ 135 is executed to update the simulation state from current state s to new state s'. When the selected control fragment $\mathcal{A}_a$ finishes executing, the simulation application restarts the same process, with the new state s' being used as the current state s, to select and execute another best control fragment. In one embodiment, the simulation application may use deep Q-learning in offline training to train the Q-networks 145 for each task. As discussed in greater detail below, deep Q-learning starts from a randomly initialized Q-network, and the learning process repeatedly executes the simulation pipeline and collects simulation experiences to evolve the Q-network toward a better approximation. Unlike online simulation, which occurs after training and always takes the best action, the offline learning process may employ an exploration strategy that selects non-optimal control fragments probabilistically to explore the state-action space. The selected control fragments are executed to control the character, after which the simulation application evaluates the simulation using the reward function 115 and updates the Q-network based on the evaluation. In one embodiment, both the reward function 115 and the exploration strategy used in training may favor the original sequence from the input tracking controller 110. As discussed, the original sequence should be largely kept to maintain quality of the resulting motion.

More formally, the scheduling problem may be formulated as a Markov Decision Process (MDP) represented by a tuple (X, A, T, R, γ) with a state space X, an action set A, a transition function T, a reward function R, and a discount factor γ. The problem has a hybrid state space, where a state x=(s, u, ã)∈X models the continuous simulation state s∈S, the optional task parameter u∈U, and the previous action ã∈A that was just taken. Taking an action a∈A at state x leads to a state transition T: (x,a) ↦ x':

$$T: \left( \begin{bmatrix} s \\ u \\ \tilde{a} \end{bmatrix}, a \right) \mapsto \begin{bmatrix} s' \\ u' \\ \tilde{a}' \end{bmatrix} = \begin{bmatrix} \mathcal{A}_a(s) \\ u \\ a \end{bmatrix}, \quad (1)$$

where s'=$\mathcal{A}_a$(s) represents the simulation under the control of the control fragment $\mathcal{A}_a$. The reward function r=R(x, a, x') is used to evaluate this state transition and determine how it fulfills a given task. A control policy, in this case a scheduler, π: X ↦ A, defines a mapping from the state space to the action set. Starting from state x, repeatedly executing a control policy π leads to a transition sequence {$x_0$=x, $a_0$, $r_0$, $x_1$, $a_1$, $r_1$ ...} that satisfies $a_t$=π($x_t$), $x_{t+1}$=T($x_t$, $a_t$) and $r_t$=R($x_t$, $a_t$, $x_{t+1}$). The evaluation of π at state x may be given by a discounted accumulative reward $V^\pi(x) = E_{t=0}^\infty \gamma^t r_t$ over the transition sequence, where the discount factor γ (e.g., γ=0.95) implicitly determines the planning horizon.

Solving the MDP problem, such as the scheduling problem, means figuring out an optimal control policy that has the maximal accumulative reward over all possible states. Q-learning is a class of model-free methods that solves the MDP problem by evolving a Q-value function defined as $Q^\pi(x,a)=r+\gamma V^\pi(x')$, with the optimal Q-value function recursively satisfying the Bellman equation:

$$Q^*(x,a)=r+\gamma \max_{a'} Q^*(x',a'). \quad (2)$$

Once the optimal Q-value function is found, the optimal policy π* may be derived as $$\pi^*: x \mapsto \arg\max_a Q^*(x,a). \quad (3)$$

It should be understood that the hybrid state space in the scheduling problem necessitates the use of a parameterized Q-value function Q(x, a; θ), where θ represents the parameters. In one embodiment, an artificial neural network is used to approximate this function and train the function using deep-Q learning. For simplicity, this neural network is referred to herein as a Q-network.

Figure 2:
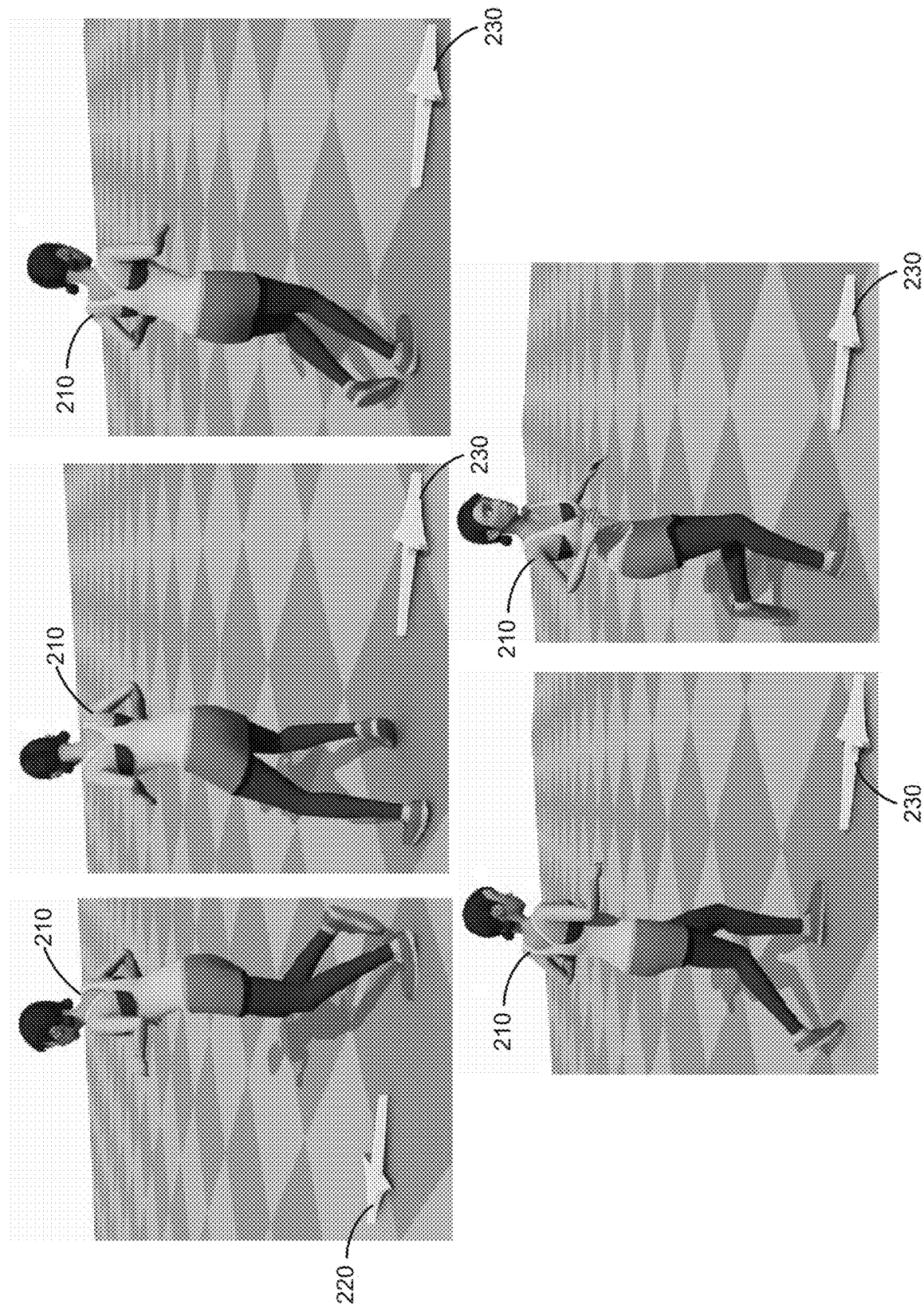
FIG. 2 illustrates a simulation of a character, according to an embodiment.

FIG. 2 illustrates a simulation of a character 210, according to an embodiment. As shown, the character 210 is running in the simulation and changes from one direction 220 to another direction 230 according to, e.g., a user input in the form of a task. The simulation application is responsible for selecting control fragments for controlling the character 230 based on the state of simulation and the task. In one embodiment, the simulated character 210 may be modeled as an underactuated articulated rigid body system with a floating root joint mounted on the character's pelvis. Two sets of selected properties, s=$s_m \cup s_e$ may be used to represent the state of simulation, where $s_m$ models the character's 210 movement and $s_e$ captures the state of objects in the environment that interact with the character 210. These properties may be measured in reference coordinates horizontally moving with the character 210, one of whose horizontal axes is aligned with the character's 210 facing direction. It should be understood that there are many candidate properties, such as the properties $s_m$=($q_0$, $h_0$, c, $\dot{c}$, $d_l$, $d_r$, L), which is an 18-dimensional vector including the orientation $q_0$ and height $h_0$ of the root joint, the centroid position c and velocity $\dot{c}$, the vectors pointing from the center of mass (CoM) to the centers of left foot $d_l$ and right foot $d_r$, and the angular momentum L. The environmental state $s_e$ may be defined for each behavior. For example, the environmental state $s_e$ may be set to $s_e$=∅ for behaviors that do not interact with moving objects, such as running and breakdancing. As another example, for a stable oscillation on a bongo board, the environmental state $s_e$ may be chosen as the relative position of the bongo board's wheel with respect to the character's 210 CoM and the velocity of the wheel.

The task parameter u∈U includes parameters that a user may interactively control at runtime via, e.g., a keyboard or joystick. For example, when controlling the direction in which a character 210 runs or skateboards, the task parameter may be chosen as the angle between the current direction and the target direction. Other tasks may not have a controllable parameter, such balancing on a bongo board. In such a case, the task parameter may be set to U=Ø.

The state vector x=(s, u, ã) in the MDP scheduling problem includes both the simulation state s and the task parameter u. In addition, the state vector records the index of the previous action a for identifying an in-sequence action, as discussed in greater detail below. In one embodiment, the scheduler takes s and u into consideration when selecting the next action, where each dimension of the simulation state s is centralized and scaled according to the mean and standard variance of the reference motion clips from which the input tracking controllers are constructed, and the task parameter u is normalized according to the range of its possible values.

To go from one state to the next (e.g., from state s to state s'), the simulation application executes a control fragment selected by a scheduler. In one embodiment, the input tracking controller may maintain a time-indexed reference trajectory (of joint angles) and compute control signals from it. A series of short fragments of the original tracking control may be obtained by cutting the reference trajectory into small pieces. Such fragments of the tracking controller are referred to herein as "control fragments." If the original tracking controller has associated feedback policies, such policies may also be embedded into the corresponding control fragments. Every scheduler takes a collection of such control fragments, obtained from one or more tracking controllers, as an "action set." A scheduler may then select a control fragment, and the tracking control is rescheduled to the time of the particular reference trajectory corresponding to the fragment. In one embodiment, each tracking controller may be cut with an interval δt that is predefined according to the length of its reference trajectory. It should be understood that the exact value of δt is not critical, but a δt that is too long may become less responsive to changes while a δt that is too short may increase the difficulty in learning the scheduler. In a particular embodiment, δt may be chosen as δt=0.1 s for each tracking controller with which the corresponding reference trajectory is able to be evenly split.

Executing a control fragment includes applying its associated feedback policy, computing control signals, and advancing the simulation by δt seconds. This process may be represented as $$s' = \mathcal{A}(s), \quad (4)$$

where $\mathcal{A}$ represents the control fragment being executed, s and s' are the simulation states before and after the execution, respectively. At runtime, the scheduler selects a new control fragment according to s' once the current one finishes. The segmentation of the input tracking controllers suggests a reference sequence O={⟨ã, a⟩}, where an action pair ⟨ã, a⟩ indicates that control fragment $\mathcal{A}_{\tilde{a}}$ is followed by $\mathcal{A}_a$, in an input tracking controller. An action a is referred to herein as an in-sequence action of action ã if ⟨ã, a⟩∈O; and otherwise, it is referred to herein as an out-of-sequence action. In one embodiment, this reference sequence O provides a strong prior on the order in which the control fragments should be selected to produce high-quality motions. As discussed in greater detail below, in such a case the simulation application may train the scheduler to follow the reference sequence unless out-of-sequence actions are necessary.

Figure 3:
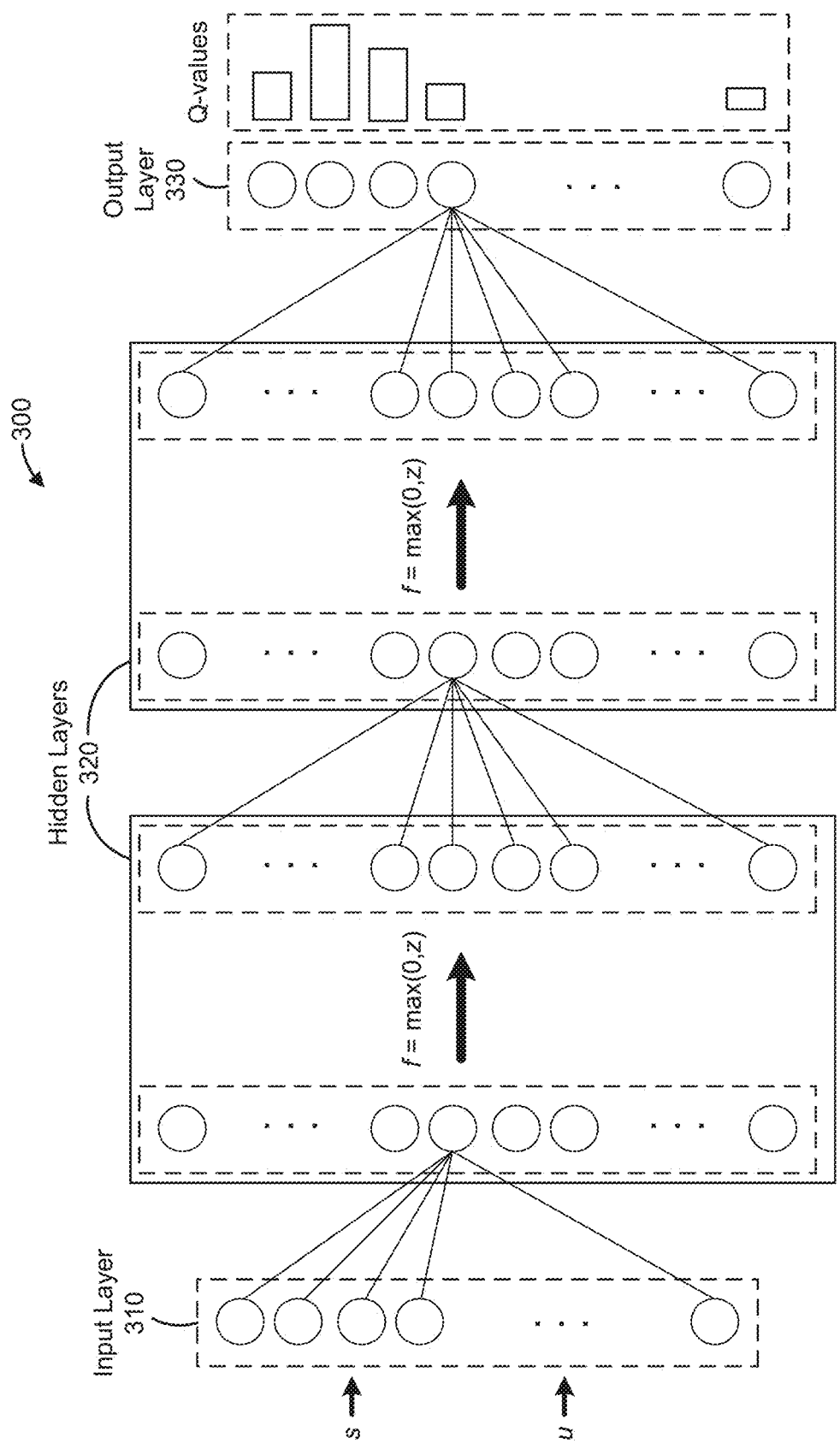
FIG. 3 illustrates an example Q-network, according to an embodiment.

FIG. 3 illustrates a Q-network 300, according to an embodiment. The Q-network 300 is an artificial neural network used to map a representation of the state of simulation to a control fragment for achieving a task. As shown, the Q-network 300 includes an input layer 310 that includes a state vector modeling the simulation state s and the task parameter u, an output layer 330 that computes the Q-values of all actions with each element of the output vector corresponding to a respective control fragment, and two hidden layers 320 which include rectified linear units (ReLU). As discussed, the scheduler includes such a Q-network 300 that evaluates each control fragment to determine how good the control fragment is in long-term simulation, as well as a linear search on the output of the Q-network 300 used to determine the best control fragment for execution from the Q-values of the control fragments output by the Q-network 300. All of the layers 310, 320, 330 are fully connected.

In one embodiment, a feedforward artificial neural network such as the network 300 may be used to approximate the Q-value function Q (x, a; θ) defined in equation (2). Rather than computing the Q-value for one state-action pair (x,a) at a time, Q-values are computed for all of the actions simultaneously with a compact network structure such as the structure of the network 300. As discussed, the input layer 310 of this Q-network may be a vector that stacks the simulation state s and the task parameter u. It should be understood that the dimension of the input layer 310 vector may differ based on the type of motion. For example, to control a character walking on a ball, the input layer 310 vector may include information about the ball, in which case the input layer 310 may be larger than for controlling a character running.

The output layer is a vector of dimension |A|, i.e., the number of actions, whose a-th component corresponds to the Q-value of action a taken at state x. With this representation, the true Q-value function may be written with index notation as $$Q(x,a;\theta) = [\tilde{Q}(x;\theta)]_a. \quad (5)$$

Experience has shown that relatively shallow networks may be successfully used to model the schedulers for the example tasks described herein. As discussed, the Q-network 300 includes two fully connected hidden layers 320, which may each include 300 ReLU whose activation function $f$ is $$f(z) = \max(0,z), \quad (6)$$

where z is the scalar input to a unit. Such an activation function may be fast and helpful to mitigate the vanishing gradient problem of traditionally used sigmoid-like function. Although discussed herein primarily with respect to such a ReLU activation function, other types of hidden layers, such as hidden layers with sigmoid units or other ReLU variants, may be used in alternative embodiments. The network parameter θ includes the weights and bias terms of both hidden layers and the output layer.

Given the structure of the Q-network 300, the simulation application may learn separate schedulers for each task, each of the schedulers including a Q-network having the structure of the Q-network 300, but which may have different numbers of input and output units. The goal of learning is to find an approximation function able to evaluate each control fragment based on long-term rewards, such as the difference between a current direction and a target direction for a running character or balancing as long as possible. In one embodiment, the simulation application may use a deep Q-learning algorithm to train the Q-networks. For example, the deep Q-learning algorithm may iteratively update network parameters θ by small steps that minimize the loss function $$L(\theta)=E_{x,a,x'}[\|y(x,a,x';\hat{\theta})-Q(x,a;\theta)\|^2]+w_r\|\theta\|^2, \quad (7)$$

where the regularization term is weighted by, e.g., $w_r$=0.001. Unlike an ordinary regression problem, the target function $$y(x, a, x'; \hat{\theta}) = \begin{cases} r + \gamma\max_{a'} Q(x', a'; \hat{\theta}), & x' \notin X_{fail} \\ 0, & x' \in X_{fail} \end{cases} \quad (8)$$

is changing with the update of the current parameters $\bar{\theta}$. Here, the terminal set $X_{fail}$ includes the states in which the tracking controller will fail, e.g., the character is falling.

In one embodiment, the simulation application may update the network parameters θ after every transition step using a batch stochastic gradient descent method. In such a case, the loss function of equation (7) may be evaluated over a minibatch consisting of, e.g., $N_{batch}$=50 transition tuples randomly selected from a sample set D={$(x_i, a_i, r_i, x'_i)$}, which stores up to, e.g., $N_D$=10$^6$ most recent transition tuples. The update rule may be written as:

$$\theta = \theta + \alpha \frac{L'_\theta}{L_0}, \quad (9)$$

where α is the learning rate and $L'_\theta$ is the derivative of the loss function with respect to θ, which may be efficiently computed through backpropagation. In a particular embodiment, a variation of the RMSprop algorithm may be used to scale the gradients, with the scale factor being computed as $$L_0=\sqrt{MA[L'_\theta{}^2]-(MA[L'_\theta])^2+\delta_0}, \quad (10)$$

where MA[z]=(1.0−β)MA[z]+βz is the moving average of a quantity z with decay factor β, and $\delta_0$ is a small constant for avoiding the divide-by-zero issue. In such a case, the constants in equation (10) may be taken as, e.g., β=0.05 and $\delta_0$=0.01, and the simulation application may learn at a rate α=2.5×10$^6$ at the beginning of the learning process, which is halved every 2×10$^6$ steps. Further, rather than updating the target function of equation (8) in every step, it has been suggested that $\hat{\theta}$ may be kept unchanged for a fixed $N_{backup}$ steps to reduce the variation of the target function and improve stability of the learning algorithm. For example, $N_{backup}$ may be chosen as $N_{backup}$=5000.

TABLE 1

Algorithm 1 Learning of Q-network
1: initialize D ← ∅
2: initialize a Q-network with random parameters θ
3: backup current parameters $\hat{\theta}$ = θ
4: loop
5:    choose a starting state $x_0$ = $(s_0, u_0, \tilde{a}_0)$:
6:    t ← 0
7:    while $x_t \notin X_{fail}$ and t < $T_{episode}$ do
8:      select an action $a_t$ according to $x_t$ = $(s_t, u_t, \tilde{a}_t)$:
9:        with probability $\epsilon_r$, select a random action
10:       with probability $\epsilon_r$, select $a_t$ s.t.$\langle \tilde{a}_t, a_t \rangle \in O$
11:       otherwise select $a_t$ = argmax$_a Q$ $(x_t, a, \theta)$
12:      $x_{t+1}$ ← T($x_t, a_t$); $r_t$ ← R($x_t, a_t, x_{t+1}$)
13:      store transition tuple ($x_t, a_t, r_t, x_{t+1}$) in D
14:      update θ with batch stochastic gradient descent TABLE 1-continued 15:      every $N_{backup}$ steps backup θ to $\hat{\theta}$
16:      t ← t + 1
17:    end while
18: end loop An example algorithm for deep-Q learning is shown in Table 1, which outlines the major steps of the learning process. Starting from a randomly initialized Q-network, the outer loop of the algorithm repeatedly generates episodes of simulation and updates the parameters until a successful scheduler is found. Each simulation episode may begin with a chosen starting state $x_0$. The inner loop of the algorithm iteratively elongates the episode by selecting an action $a_t$ according to the current state $x_t$, executing the corresponding control fragment $\mathcal{A}_{a_t}$ to advance the state to $x_{t+1}$, computing the immediate reward $r_t$, storing the transition tuple ($x_t, a_t, r_t, x_{t+1}$) in the sample set D, and updating the parameters θ with the batch stochastic gradient descent as discussed above. The simulation ends when either the state $x_t$ is in the terminal region $X_{fail}$ or the maximal length of, e.g., $T_{episode}$=150 transition steps is reached.

During learning, the simulation application may create the starting state $x_0$=$(s_0, u_0, \tilde{a}_0)$ for the first episode by randomly picking a simulation state $s_0$ from those collected during the construction of the input tracking controllers, setting the associated action $\tilde{a}_0$ to be consistent with $s_0$ and, if applicable, assigning a random value to the task parameter $u_0$. If an episode ends in the terminal region, the simulation application may roll back a number (e.g., 20) of transition steps and start a new episode from that simulation state with a new task parameter $u_0$. If the episode fails too soon or ends without failing, the new starting state may be chosen in the same way as the first episode.

In one episode, the action $a_t$ may be chosen in ϵ-greedy fashion: with probability $\epsilon_r$, the random exploration strategy is applied and a random action is selected; with probability $\epsilon_O$, the tracking exploration strategy is applied and an in-sequence action $a_t$ that satisfies $\langle \tilde{a}_t, a_t \rangle \in O$ is selected; otherwise, the action $a_t$=argmax$_a Q(x_t, a, \theta)$ is selected, which exploits the current scheduler. In a particular embodiment, the probability $\epsilon_r$ may be fixed to 0.1 and $\epsilon_O$ may be linearly annealed from 0.9 to 0.1 in the first $N_A$=|A|×10 k steps, where |A| is the number of actions. Experience has shown that the tracking exploration strategy significantly accelerates the learning process. For example, the learned scheduler may be checked every one million steps and the learning process stopped if a successful scheduler is found.

When performing the control fragment $\mathcal{A}_a$, the simulation application may further apply noise torques $\tau_\epsilon$=$\mathcal{N}(0, \sigma_\tau^2)$ to every DoF of the character's legs and waist, where the noise level $\sigma_\tau$=5 Nm. This procedure forces the learning algorithm to visit more possible states even under the same action sequence and allows the learned scheduler to deal with larger uncertainty. The hyper-parameters discussed above may be chosen empirically on tasks such as balancing on a bongo board, and the same values used for other tasks.

During learning, the control fragments selected using the Q-network are executed to control the character, after which the simulation application evaluates the simulation using a reward function and updates the Q-network based on this evaluation using, e.g., the gradient descent method. The reward function may be chosen to prefer the original tracking controller sequence to preserve the quality of the motion.

In one embodiment, the reward function R:X×A×X→$\mathbb{R}$, which may be used to specify the task that the scheduler is designed to accomplish, may be a summation of four penalty terms:

$$R(x,a,x')=E_{tracking}+E_{preference}+E_{feedback}+E_{task}+R_0, \quad (11)$$

where $R_0$ is a default reward (e.g., $R_0=5$) returned when all of the requirements of the task are satisfied, and otherwise penalties apply so that the final reward is less than $R_0$. The tracking term $E_{tracking}$ of the reward function penalizes out-of-sequence actions, i.e., actions that do not follow the reference sequence O, by $$E_{tracking}(x, a, x) = \begin{cases} 0 \langle \tilde{a}, a \rangle \in O \text{ or } \tilde{a} \notin \tilde{O} \\ -d_0 \text{ otherwise} \end{cases}, \quad (12)$$

where $d_O>0$ is a constant penalty, $\tilde{O}=\{\tilde{a}, \exists a, \langle \tilde{a}, a\rangle \in O\}$. This term gives strong preference to the reference sequence while still allowing out-of-sequence actions when necessary. In a particular embodiment, $d_O$ may be set to $d_O=2.0$. The action preference term $E_{preference}$ reflects the user's preference when a task is able to be accomplished by multiple actions. Taking $A_I$ to represent the predetermined subset of favored actions in A, $E_{preference}$ may be defined as $$E_{preference} = \begin{cases} 0 & a \in O \\ -d_p & \text{otherwise} \end{cases}, \quad (13)$$

where $d_p>0$ is a constant penalty. In a particular embodiment, $d_p$ may be set to $d_p=0.2$. The feedback term $E_{feedback}$, discussed in greater detail below with respect to different types of tracking controllers, penalizes excessive feedback when the control fragments have associated feedback policies. Excessive feedback may occur as a result of a failure that the feedback policy cannot handle or because an improper action has been taken, either of which may produce poor quality results. The task term $E_{task}$, also discussed in greater detail below, models task-dependent penalties, such as the penalty on failing to move in a target direction.

Figure 4:
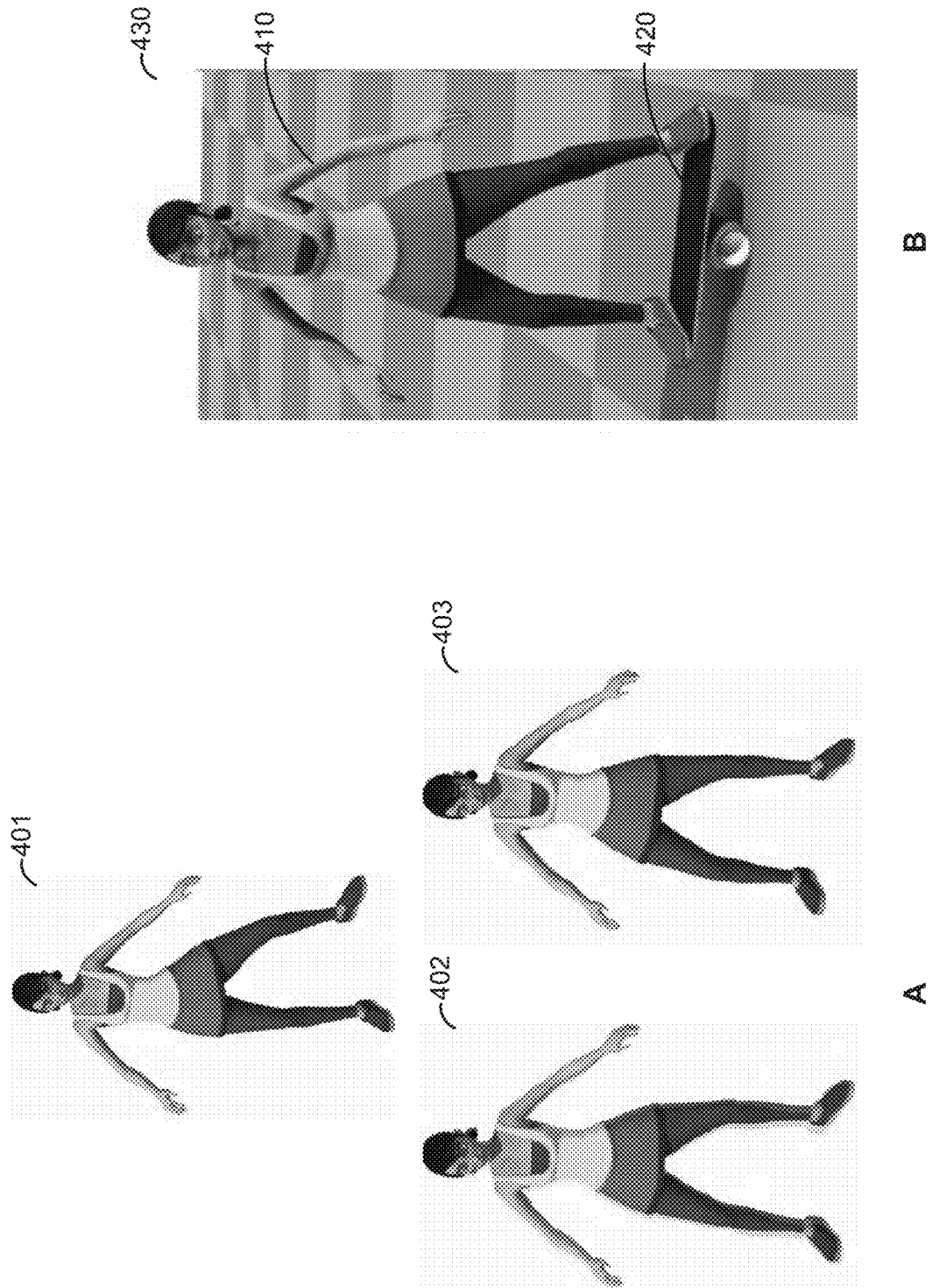
FIG. 4 illustrates an example bongo boarding simulation employing a scheduler learned for open-loop control fragments, according to an embodiment.

FIG. 4 illustrates a bongo boarding simulation employing a scheduler learned for open-loop control fragments. Panel A shows frames 401-403 depicting a character 410 performing motions based on reference motion capture clips of a subject oscillating on a bongo board. Panel B shows a frame 430 depicting the character 410 being simulated to balance on the bongo board using a scheduler learned for open-loop control fragments. The simulation application may construct open-loop tracking controllers from the reference motion capture clips via trajectory optimization. In one embodiment, the Sampling-based Contact-rich Motion Control (SAMCON) algorithm may be used. SAMCON is a sampling based technique that constructs controllers from reference motion capture clips and outputs a target trajectory that can be tracking with PD-servos to reproduce the input motion clip. As there is a lack of feedback, the open-loop tracking controller is only able to produce a single motion from a designated starting state.

The simulation application is configured to segment the open-loop tracking controller into a number of open-loop control fragments that collectively reproduce one cycle of the reference oscillation. For example, the simulation application may segment the open-loop tracking controller into control fragments that each include a short piece of the SAMCON-generated target trajectory, producing a short clip of the target behavior. As the control fragments have no associated feedback policies, the task term $E_{feedback}$ may be taken to be 0. In a particular embodiment, the simulation application may learn a scheduler that schedules the control fragments to allow the character 410 to maintain balance on a bongo board 420 without external perturbations. An example frame from a simulation in which the character 410 maintains balance on the bongo board 420 is shown in panel B. Experience has shown that, in such a simulation, the scheduler tends to constantly take out-of-sequence actions, breaking the reference cycle embedded in the reference order. For this reason, the character may be able to stay on the board 420 during the simulation, but the character 410 may not reproduce the reference oscillation.

In one embodiment, the inner sides of both of the character's 410 feet may be attached to the bongo board 420 with a pin joint. Further, the environmental state for the bongo boarding task may be taken as $s_e=\{v_{wheel}, d_{wheel}\}$, which models the velocity of the wheel $v_{wheel}$ and the relative position between the wheel and the character's 410 CoM, $d_{wheel}$. In this open-loop tracking case, user control may not be included in the task, and U set to $U=\emptyset$. In addition, the task term of the reward function may be chosen to penalize horizontal deviation between the character's 410 CoM and the wheel as $$E_{task}=-f(\|d^*_{wheel}\|-0.1), \quad (14)$$

where $d^*_{wheel}$ represents the horizontal components of $d_{wheel}$.

As another example of a simulation based on scheduling of open-loop control fragments, the simulation application may perform a simulation of the character 410 walking on a ball in a similar manner to the simulation of the character 410 on the bongo board 420. In such a case, the input open-loop tracking controller may also be constructed from short motion capture clips in which, e.g., the subject walks a few steps on the ball and moves forward. The simulation application may then segment this input tracking controller into a set of open-loop control fragments and learn a scheduler for scheduling the control fragments. There need not be a reference clip for turning, as the learned scheduler may allow the character 410 to walk stably on the ball and slowly turn to a target direction controlled by the user. In one embodiment, the environmental state for the ball-walking simulation may be $s_e=\{v_{ball}, d_{ball}\}$, where $v_{ball}$ is the velocity of the ball and $d_{ball}$ is a vector pointing from the character's 410 CoM to the center of the ball. In such a case, the task parameter $U=\{\varphi\}$ is an angle between the current direction of motion and the target direction, and the task term $E_{task}$ of the reward function may be defined as $$E_{task}=E_{CoM}+E_{direction}, \quad (15)$$

where the balance term $E_{CoM}=-\|d^*_{ball}\|$ keeps the character's 410 CoM above the ball, with $d^*_{ball}$ representing the horizontal components of $d_{ball}$, and the direction term $E_{direction}$ controlling the direction of motion by $$E_{direction}=-f(\epsilon_c-\|\dot{\mathcal{C}}\|)-f(\delta\varphi-\epsilon_\varphi), \quad (16)$$

where the function $f$ is the rectifier defined in equation (6). In a particular embodiment, the first penalty term of equation (16) may take effect when the character 410 moves slower than $\epsilon_c=0.1$ m/s, while the second term may penalize the directional error if such an error exceeds a threshold $\epsilon_\varphi=5°$.

Figure 5:
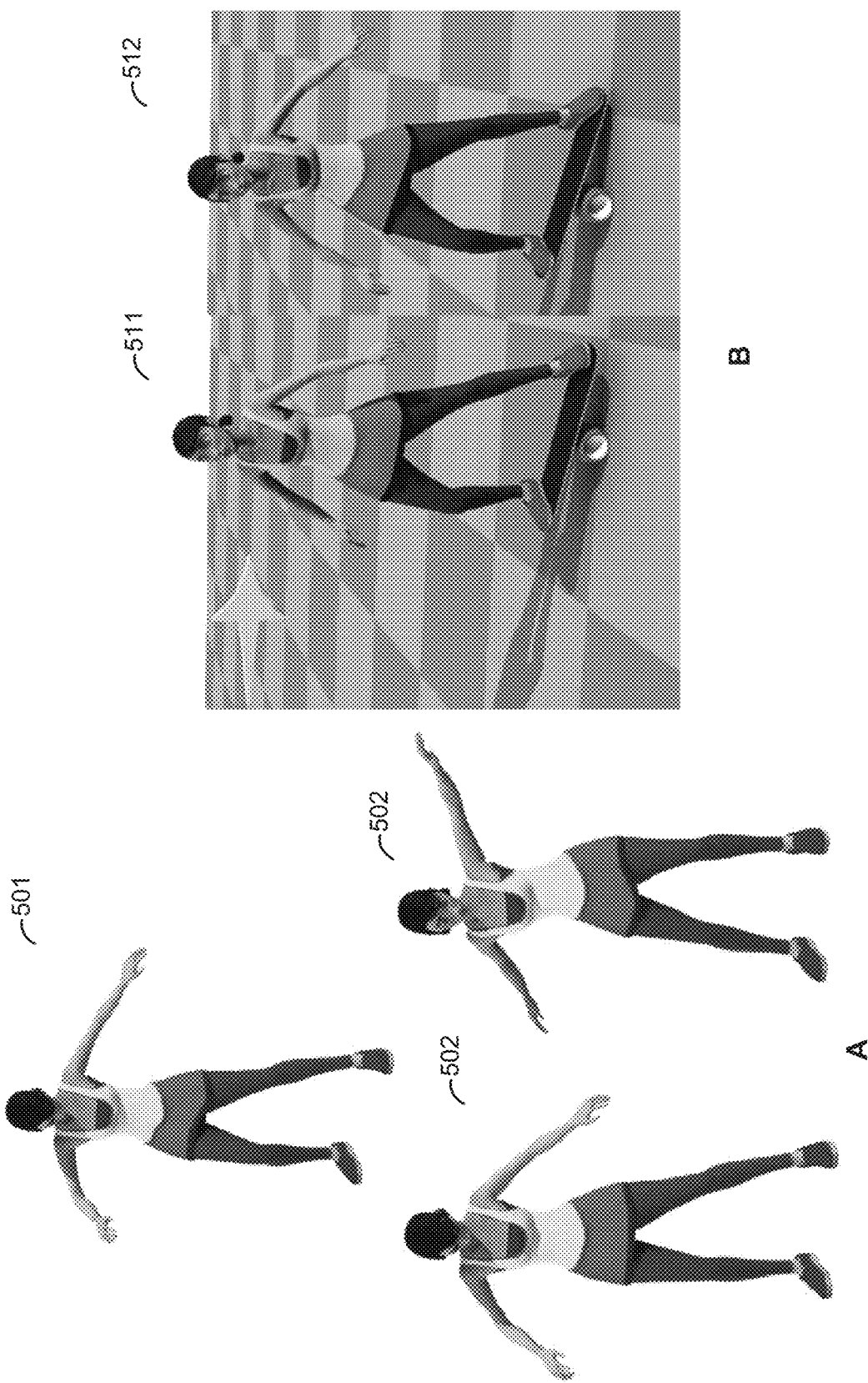
FIG. 5 illustrates the example bongo boarding simulation employing a scheduler learned for feedback-augmented control fragments, according to an embodiment.

FIG. 5 illustrates the bongo boarding simulation employing a scheduler learned for feedback-augmented control fragments. Panel A shows frames 501-503 depicting the character 410 performing motions based on reference motion capture clips of a subject regaining balance on a bongo board by touching the ground. Panel B shows frames 511-512 depicting the character 410 being simulated to regain balance on the bongo board using a scheduler learned for feedback-augmented control fragments. As discussed, when a scheduler is learned for open-loop fragments, the lack of feedback may result in the constant use of out-of-sequence actions, which may lead to poor quality motions on cyclic behaviors such as running, as the scheduler has to repeatedly break the motion cycles. To remedy this problem, the open-loop control fragments may be enhanced with associated linear feedback policies learned, e.g., using the Guided SAMCON algorithm. Such feedback-augmented control fragments may stabilize the simulation within the vicinity of the reference motion, so long as the starting state falls into the basin of attraction of the associated feedback policy. The simulation application may further learn a scheduler upon the feedback-augmented control fragments. In addition, to deal with perturbations such as moderate sideways pushes that would otherwise cause the character 410 to fall over, an additional auxiliary motion may be included where the character 410 regains balance by touching the board on the ground and resuming the balancing task. Typical construction of tracking controllers using the Guided SAMCON algorithm cannot be directly applied to this task as there is not a predefined transition between the auxiliary motion and the oscillation. To solve this problem, the construction process may be enhanced by allowing out-of-sequence control fragments to be taken with 0.1 probability during the construction. That is, the Guided SAMCON algorithm, which in its original form requires that the control fragments are well organized (e.g. the transitions between the oscillation and the auxiliary motion must be predefined in the bongo board task), is modified by allowing out-of-sequence control fragments in this particular task. The resulting action set may then include both the new control fragments and their mirror actions. During learning, a strong preference may be given to the oscillation by setting, e.g., $d_p=2.0$ in the preference term of equation (13), and the learning process automatically discovers the necessary transitions which allow the character 410 to land the board 420 to regain balance when necessary and then return to a stable oscillation. Experience has shown that a scheduler learned on feedback-augmented control fragments is driven by the reference timing most of the time, with a relatively small number of out-of-sequence action pairs (rather than constant out-of-sequence actions as in the open-loop fragments case) that may appear occasionally and be needed for the success of the control. This shows that the freedom to choose appropriate out-of-sequence actions may be needed for success of the task, while the feedback policies may help the action pairs stay in the reference sequence, improving motion quality.

In one embodiment, when a control fragment $\mathcal{A}_a$ is performed, its associated feedback policy may compute a corrective offset $\Delta_a$ according to the current simulation state. $\Delta_a$ includes the additional rotations on several selected joints, such as hips, knees, and waist, and $\Delta_a$ may be applied to every frame of, e.g., the corresponding target trajectory output by the SAMCON algorithm. The feedback term $E_{feedback}$ may then be defined as $$E_{feedback} = -f(\|\Delta_a\| - \epsilon_F) \quad (17)$$

for the control fragments, where $\epsilon_F$ is a constant threshold that indicates a normal range of feedback. In a particular embodiment, $\epsilon_F=0.2$ rad may be used. To further facilitate the learning process, during the random exploration procedure of the learning process, the simulation application may only choose the control fragments whose feedback are less than a threshold $\Delta_{max}$. In the tracking exploration procedure and the exploitation procedure, if the selected control fragment results in a corrective offset that exceeds $\Delta_{max}$, then the state may be considered to be a failure, and the current simulation episode may be terminated. In a particular embodiment, $\Delta_{max}=1.5$ rad may be used.

As another example of a simulation based on scheduling of feedback-augmented control fragments, the simulation application may perform a simulation of the character 410 riding on a skateboard. The simulation application may apply a damping torque proportional to the rotational speed of each wheel to slow the skateboard down so that the character 410 has to push off the ground to keep moving. Similar to the bongo boarding task, the inner-front end of the character's 410 right foot may be fixed on the skateboard with a ball joint which stabilizes the contacts while still allowing the right foot to rotate. The construction process of the control fragments may be augmented with an extra cost term that penalizes any board lifting or tilting to keep the skateboard on the ground. In one embodiment, the simulation application may build control fragments from four different behaviors: pushing off the ground, rolling on the board, and two kick turns to the left and right. In such a case, the reference sequence O may alternate between the pushing and other movements. In addition, the action preference term $E_{preference}$ may be set to favor rolling on the board so that the character 410 stays on the board as long as possible and pushes off the ground to accelerate only if the board slows down too much. When the target direction of travel changes, the turning actions may be automatically activated when the character 410 skateboards stably enough and executed repeatedly until the target direction is achieved. In one embodiment, the environmental state $s_e=\{d_L, \theta_L, d_R, \theta_R\}$ used may be a six-dimensional vector that includes the horizontal distance between the skateboard and both of the character's 410 feet, and their relative orientation around the vertical axis. The goal of the skateboarding task may be to achieve interactive navigation on a flat terrain, and the user-controlled task parameter may be set to $U=\{\varphi\}$, with the task term $E_{task}$ being the directional cost of equation (16) with $\epsilon_c$ and $\epsilon_\varphi$ set to, e.g., $\epsilon_c=2.0$ m/s and $\epsilon_\varphi=10°$. Experience has shown that, even when the scheduler is learned on a flat terrain, it may be able to survive on rough terrain with some bumps.

As yet another example of a simulation based on scheduling of feedback-augmented control fragments, the simulation application may perform a simulation of the character 410 running. In such a case, the running task may have the same goal as the skateboarding task and use the same task parameter and task reward discussed above. In one embodiment, three running controllers are used for this task, including a forward run, a smooth right turn, and a 90° right turn. The mirrors of the turning controllers are also included to produce left turns. In such a case, the reference sequence O may randomly concatenate these controllers with consistent contact feet. In addition, the action preference term $E_{preference}$ may be set to the forward run. During simulation, the learned scheduler may automatically select either the 90° turn or the smooth turn according to the difference between the current running direction and the target direction. Unlike the bongo boarding and skateboarding tasks, the learned scheduler for the running task may follow the reference sequence most of the time. Experience has shown that such a learned scheduler is also able to select out-of-sequence actions to prevent falling when the character 410 trips over a small bump or runs on a patch of icy ground where the coefficient of friction is small.

As a further example of a simulation based on scheduling of feedback-augmented control fragments, the simulation application may perform a simulation of the character 410 recovering from a push. In this task, the simulation application may apply, e.g., horizontal pushes on the character's 410 trunk. In one embodiment, eight response movements may be used, each of which starts after a push from one of the eight directions and ends with the same standing pose after taking one or two steps. In such a case, the reference sequence O may include only the transitions from these response movements to the in-place standing. There need not be prior knowledge of which movement should be used to respond to an unforeseen push. Rather, the simulation application may train the scheduler with an action set of control fragments, a preference term $E_{preference}$ that favors the standing actions and a task term $E_{task}$ set to zero. During the learning process, the simulation application may apply a horizontal push periodically (e.g., every 2 seconds) from a random direction, with transition tuples obtained during these pushes being discarded. Experience has shown that the character 410 may take steps to regain balance after a push.

As yet another example of a simulation based on scheduling of feedback-augmented control fragments, the simulation application may perform a simulation of the character 410 breakdancing. In one embodiment, two breakdancing stunts may be learned, a jump flip and a swipe movement, with the goal being to allow a user to interactively select one of these movements at runtime that the character then tries to perform repeatedly until the user election changes. In such a case, two reference motions may be used for the task, each including a short preparation movement followed by one of the stunts. The reference sequence O may repeat the two movements separately. Further, the task parameter $U=\{A_0, A_1\}$ may include two subsets of preferred actions, where $A_0$ includes the airborne phase of the jump flip and $A_1$ includes the swipes of the swipe movement. As a result, the value of $u \in U$ is either 0 or 1. In addition, the task reward $E_{task}$ may be set to zero and strong preference given to the selected action by setting, e.g., $d_p=2.0$ in equation (13). Experience has shown that, even without a predefined transition, the simulated character is able to respond to a user selection of a new stunt by finishing the current stunt, taking preparation movement to the target action, and performing the new movement repeatedly. The simulation application may also skip the preparation movements when directly repeating the selected stunt is likely to succeed.

Although examples are given of open-loop control fragments and feedback-augmented control fragments, a learned scheduler itself may be a special control fragment. Each time it is activated, such a scheduler fragment selects and performs one sub-fragments from its action set and returns the reward of that sub-fragment as its own reward. The simulation application may combine such a learned scheduler with ordinary control fragments and learn a hierarchical scheduler upon this hybrid action set without modifying the learning method. For example, the breakdancing simulation discussed above may be enhanced by incorporating a getting-up behavior with feedback-augmented control fragments, and the preference term of the reward function may be set to penalize all control fragments except for the learned scheduler fragment. Experience has shown that, under the control of the new scheduler, the character is able to sit up immediately after falling and start to breakdance again.

Figure 6:
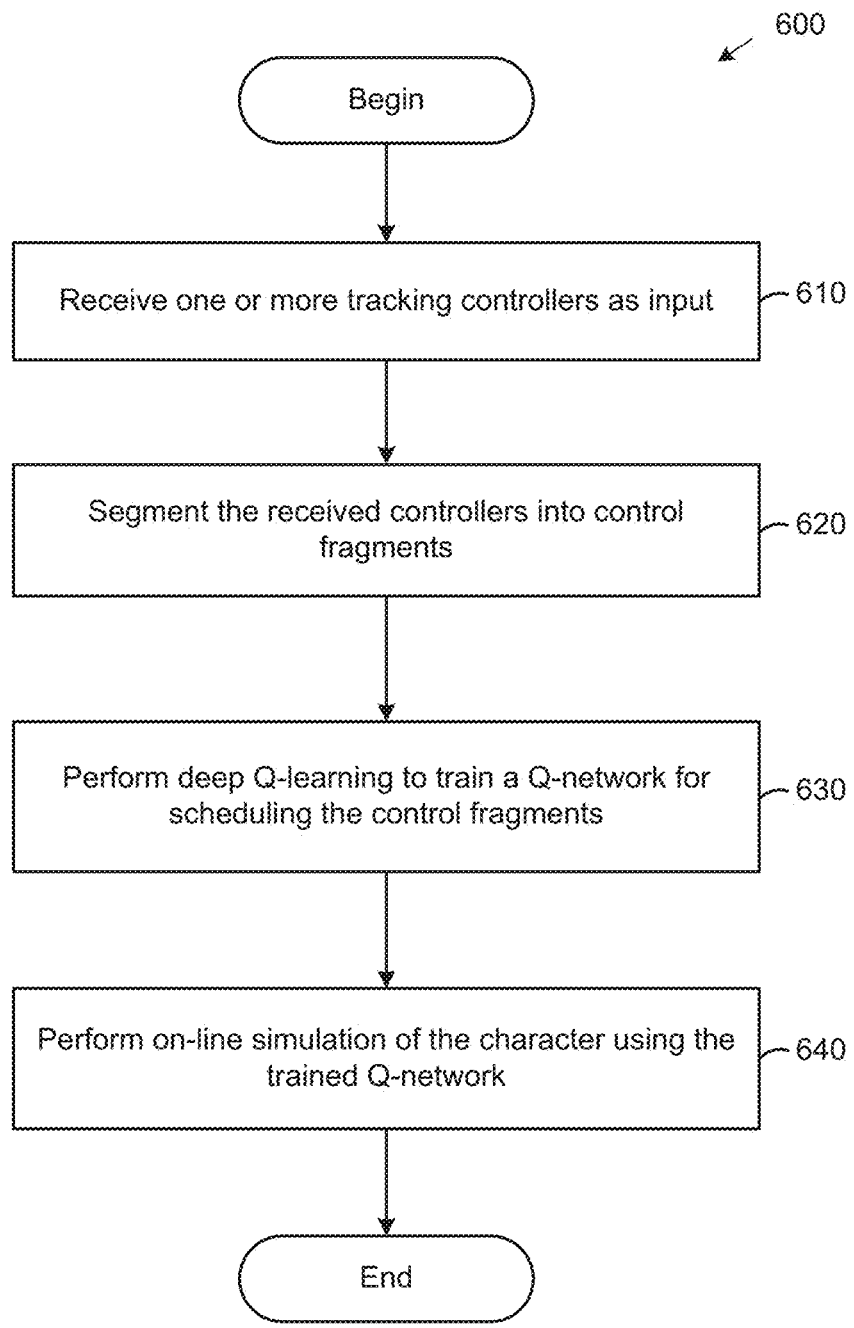
FIG. 6 illustrates a method for simulating a virtual character or controlling a robot, according to an embodiment.

FIG. 6 illustrates a method 600 for simulating a virtual character (or controlling a robot), according to an embodiment. As shown, the method 600 begins at step 610, where a simulation application receives one or more tracking controllers as input. In one embodiment, the tracking controllers may be constructed from motion capture data using, e.g., the SAMCON algorithm. In such a case, the constructed tracking controllers may be, e.g., open-loop controllers, feedback-augmented controllers that each include a linear feedback policy to stabilize the simulation within the vicinity of the reference motion, or hybrid controllers.

At step 620, the simulation application segments the received controllers into control fragments. The control fragments may be, e.g., 0.1 s in length, and the control fragments collectively form an action set. The simulation application may schedule such control fragments to execute at each time step based on the simulation state and the task.

At step 630, the simulation application performs deep Q-learning to train a Q-network for scheduling the control fragments. As discussed, deep Q-learning starts from a randomly initialized Q-network, and the learning process repeatedly executes simulations and collects simulation experiences to evolve the Q-network toward a better approximation. The scheduler selects control fragments based on the output of the Q-network, given input of a high-level state representation and task parameters, and the simulation application then executes those selected control fragments to control the character, after which the simulation application evaluates the simulation using a reward function and updates the Q-network based on the evaluation. In one embodiment, the deep Q-learning may use algorithm 1, discussed above. In such a case, both a reward function and an exploration strategy used in training to probabilistically select non-optimal control fragments may favor the original sequence from the input tracking controller.

At step 640, the simulation application performs an on-line simulation of the character using the trained Q-network. During such an online simulation after training, the learned Q-network is given representations of the simulation state and tasks as input and outputs the long-term reward of control fragments, which may be searched to determine a control fragment having the highest long-term reward, i.e., the best control fragments. The simulation application then executes those best control fragments to control the motion of the character (or robot).

Figure 7:
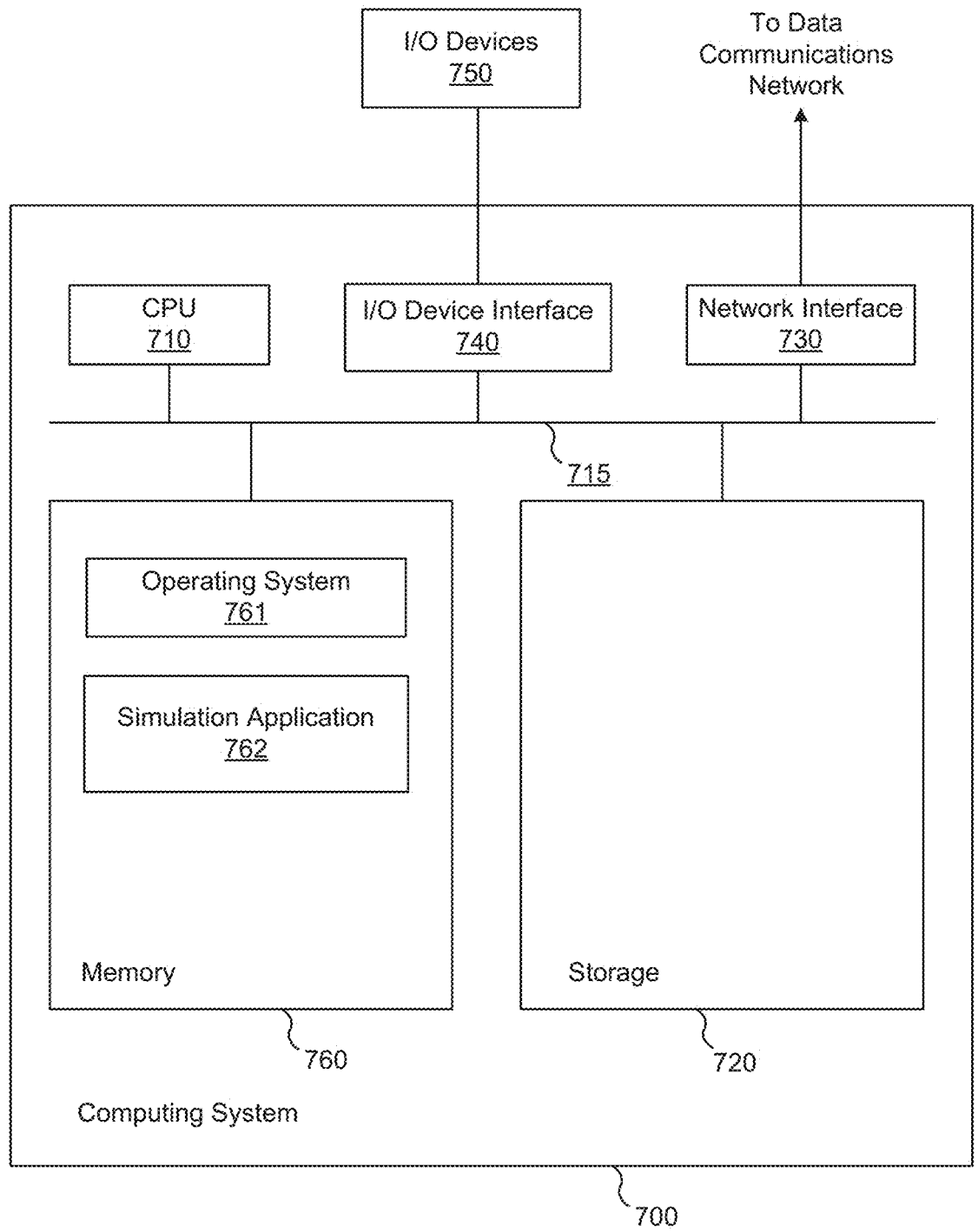
FIG. 7 illustrates a computer system in which an embodiment may be implemented.

FIG. 7 illustrates a computer system 700 in which an embodiment of this disclosure may be implemented. As shown, the system 700 includes, without limitation, a central processing unit (CPU) 710, a network interface 730, an interconnect 715, a memory 760 and storage 720. The system 700 may also include an I/O device interface 740 connecting I/O devices 750 (e.g., keyboard, display and mouse devices) to the system 700.

The CPU 710 retrieves and executes programming instructions stored in the memory 760. Similarly, the CPU 710 stores and retrieves application data residing in the memory 760. The interconnect 715 facilitates transmission, such as of programming instructions and application data, between the CPU 710, I/O device interface 740, storage 720, network interface 730, and memory 760. CPU 710 is representative of one or more of a single CPU, multiple CPUs, a single CPU having multiple processing cores, one or more graphics processing units (GPUs), and the like. And the memory 760 is generally included to be representative of a random access memory. The storage 720 may be a disk drive storage device. Although shown as a single unit, the storage 720 may be a combination of fixed or removable storage devices, such as fixed disc drives, flash drives, removable memory cards or optical storage, network attached storage (NAS), or a storage area-network (SAN). Further, system 700 is included to be representative of a physical computing system as well as virtual machine instances hosted on a set of underlying physical computing systems. Further still, although shown as a single computing system, one of ordinary skill in the art will recognized that the components of the system 700 shown in FIG. 7 may be distributed across multiple computing systems connected by a data communications network.

As shown, the memory 760 includes an operating system 761 and a simulation application 762. Illustratively, the operating system 761 may include Linux® or Microsoft's Windows®. The simulation application 762 is configured to learn neural networks for scheduling control fragments in physics-based virtual character simulations and control of physical robots. In one embodiment, the simulation 762 may receive one or more tracking controllers as input, segment the received controllers into control fragments, perform deep Q-learning to train a Q-network for scheduling the control fragments, and perform a simulation of the character using the trained Q-network, as discussed above with respect to FIG. 6.

Although discussed herein primarily with respect to segmenting tracking controllers into control fragments, the scheduling scheme discussed herein does not exclude the use of other types of tracking control. For example, the control fragments may be replaced with a quadratic programming based balance controller, or some other type of controller. Although discussed herein primarily with respect to simulating virtual characters, techniques disclosed herein may also be adapted to control physical robots, as it will be understood that characters are typically just simplifications of physical robots that do not have to take into account various joint limits, torque limits, and noises of physical robots, among other things. Although discussed herein primarily with respect to humanoid or human-like characters, techniques disclosed herein are equally application to characters and robots that are not human-like (e.g., animal characters and robots). Although discussed herein with respect to action sets used in training schedulers, in other embodiments, the control fragments in the action sets may be changed during the learning process. Although discussed herein with respect to specific high-level representations of simulation states that are manually crafted, in other embodiments, the simulation application may learn on the full state space, relying on the full ability of a deep network to discover the feature vector. Although discussed herein with respect to motion capture data being used to construct the initial tracking controllers, alternative embodiments may use other types of data in lieu of motion capture data, such as animated sequences, recorded robot motions, or a reference-free trajectory optimization technique. Further, it should be understood that even motion capture data may be obtained in various ways, Advantageously, techniques disclosed herein provide an approach for learning to schedule control fragments and realize robust control of a wide range of behaviors of virtual characters and physical robots. For example, the schedulers may be used with characters in a video game to provide, in real time, physically realistic responses to events in the environment such as pushes and shoves from the user or other environmental disturbances. Out-of-sequence actions may be taken when necessary to create robustness to changes in environment and unexpected perturbations. The high-level representation of the state of simulation described herein, together with the use of a Q-network that provides a compact formulation to compute long-term benefit of an action, and the use of deep Q-learning permits schedulers to be efficiently trained from previous simulation results. The high-level representation of the state in particular permits techniques disclosed herein to be used across behaviors, as opposed to being behavior-dependent such as when behavior-dependent index quantities are used. The deep-Q learning process may use a reward function that prefers an original input sequence, as well as an exploration strategy that gives more chance to in-sequence control fragments, resulting in high quality motions. Experience has shown that techniques disclosed herein may be used in simulations of a wide range of dynamic behaviors, such as a character walking on a ball, balancing on a bongo board, skateboarding, running, recovering from a push, and breakdancing, among other things.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for controlling motion, the computer-implemented method comprising:
   segmenting one or more tracking controllers that maintain a time-indexed reference trajectory of at least part of a specified motion, wherein the one or more tracking controllers are segmented into a reference sequence of control fragments and based on a time interval;
   training, by a simulation application when executed by one or more computer processors, a neural network for rescheduling the reference sequence of control fragments into a different sequence, based on a state of simulation, the specified motion, and a reward function;
   using the trained neural network to reschedule the reference sequence of control fragments into a different sequence at runtime to account for the specified motion changing due to a physics-based interaction between a character and an environment; and
   executing, by the simulation application, the rescheduled sequence of control fragments to control the character to perform the changed motion, wherein the character is selected from a virtual character and a physical robot.

2. The computer-implemented method of claim 1, wherein the control fragment with the highest reward is selected for execution at each time step of the simulation, wherein each tracking controller is associated with a feedback policy, wherein each tracking controller is executed by applying the feedback policy, computing control signals, and advancing a time step of the simulation.

3. The computer-implemented method of claim 2, wherein the reward function prefers the reference sequence, wherein the training uses an exploration strategy that gives more chance to in-sequence control fragments, wherein the time interval is independent of target motion.

4. The computer-implemented method of claim 3, wherein:
the neural network computes Q-values, and
the training uses a deep Q-learning algorithm.

5. The computer-implemented method of claim 4, wherein the neural network includes (i) an input layer including a state vector modeling the simulation state and the specified motion, (ii) an output layer which computes the Q-values of all actions with each element of an output vector corresponding to a respective control fragment, and (iii) one or more hidden layers wherein each tracking controller is an open-loop controller enhanced with a linear feedback policy.

6. The computer-implemented method of claim 5, wherein the one or more tracking controllers are constructed from motion capture data, a hand-animation, recorded robot motions, and a trajectory optimization technique, wherein the character is controlled to walk on a ball, balance on a bongo board, skateboard, run, recover from a push, and breakdance, wherein the character is, in respective instances, the virtual character and the physical robot.

7. The computer-implemented method of claim 1, wherein each of the one or more tracking controllers is one of an open-loop controller or an open-loop controller enhanced with a linear feedback policy.

8. The computer-implemented method of claim 1, wherein the character is controlled to walk on a ball, balance on a bongo board, skateboard, run, recover from a push, or breakdance.

9. A non-transitory computer-readable medium storing a simulation application executable to perform operations for controlling motion, the operations comprising:
segmenting one or more tracking controllers that maintain a time-indexed reference trajectory of at least part of a specified motion, wherein the one or more tracking controllers are segmented into a reference sequence of control fragments and based on a time interval;
training, by the simulation application when executed by one or more computer processors, a neural network for rescheduling the reference sequence of control fragments into a different sequence, based on a state of simulation, the specified motion, and a reward function;
using the trained neural network to reschedule the reference sequence of control fragments into a different sequence at runtime to account for the specified motion changing due to a physics-based interaction between a character and an environment; and
executing, by the simulation application, the rescheduled sequence of control fragments to control the character to perform the changed motion, wherein the character is selected from a virtual character and a physical robot.

10. The non-transitory computer-readable medium of claim 9,
wherein the control fragment with the highest reward is selected for execution at each time step of the simulation, wherein each tracking controller is associated with a feedback policy, wherein each tracking controller is executed by applying the feedback policy, computing control signals, and advancing a time step of the simulation.

11. The non-transitory computer-readable medium of claim 10, wherein the reward function prefers the reference sequence, wherein the training uses an exploration strategy that gives more chance to in-sequence control fragments.

12. The non-transitory computer-readable medium of claim 11, wherein:
the neural network computes Q-values, and
the training uses a deep Q-learning algorithm.

13. The non-transitory computer-readable medium of claim 12, wherein the neural network includes (i) an input layer including a state vector modeling the simulation state and the specified motion, (ii) an output layer which computes an output layer which computes the Q-values of all actions with each element of an output vector corresponding to a respective control fragment, and (iii) one or more hidden layers.

14. The non-transitory computer-readable medium of claim 9, wherein the one or more tracking controllers are constructed from at least one of motion capture data, a hand-animation, recorded robot motions, or a trajectory optimization technique.

15. The non-transitory computer-readable medium of claim 9, wherein each of the one or more tracking controllers is one of an open-loop controller or an open-loop controller enhanced with a linear feedback policy.

16. The non-transitory computer-readable medium of claim 9, wherein the character is controlled to walk on a ball, balance on a bongo board, skateboard, run, recover from a push, or breakdance.

17. A system for controlling motion, the system comprising:
one or more computer processors; and
a memory including a simulation application executable by the one or more computer processors to perform operations comprising:
segmenting one or more tracking controllers that maintain a time-indexed reference trajectory of at least part of a specified motion, wherein the one or more tracking controllers are segmented into a reference sequence of control fragments and based on a time interval;
training a neural network for rescheduling the reference sequence of control fragments into a different sequence, based on a state of simulation, the specified motion, and a reward function; and
using the trained neural network to reschedule the reference sequence of control fragments into a different sequence at runtime to account for the specified motion changing due to a physics-based interaction between a character and an environment; and
executing the rescheduled sequence of control fragments to control the character to perform the changed motion, wherein the character is selected from a virtual character and a physical robot.

18. The system of claim 17,
wherein the control fragment with the highest reward is selected for execution at each time step of the simulation, wherein each tracking controller is associated with a feedback policy, wherein each tracking controller is executed by applying the feedback policy, computing control signals, and advancing a time step of the simulation.

19. The system of claim 18, wherein the reward function prefers the reference sequence, wherein the training uses an exploration strategy that gives more chance to in-sequence control fragments.

20. The system of claim 19, wherein:
- the neural network computes Q-values, and
- the training uses a deep Q-learning algorithm.

* * * * *

UNITED STATES PATENT AND TRADEMARK OFFICE
CERTIFICATE OF CORRECTION

PATENT NO. : 10,929,743 B2
APPLICATION NO. : 15/277872
DATED : February 23, 2021
INVENTOR(S) : Libin Liu et al.

It is certified that error appears in the above-identified patent and that said Letters Patent is hereby corrected as shown below:

In the Specification

In Column 6, Line 11, delete "$=E_{t=0}^{\infty}\gamma^t r_t$" and insert -- $=\Sigma_{t=0}^{\infty}\gamma^t r_t$ --, therefor.

In Column 9, Line 45, delete "$\alpha=2.5\times10^6$" and insert -- $\alpha=2.5\times10^{-5}$ --, therefor.

In the Claims

In Column 19, Line 21, in Claim 5, after "layers" insert -- , --.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*